(12) United States Patent
Guan et al.

(10) Patent No.: US 8,379,347 B2
(45) Date of Patent: Feb. 19, 2013

(54) PERPENDICULAR SHIELD POLE WRITER WITH TAPERED MAIN POLE AND TAPERED NON-MAGNETIC TOP SHAPING LAYER

(75) Inventors: Lijie Guan, San Jose, CA (US); Joe Smyth, Aptos, CA (US); Moris Dovek, San Jose, CA (US); Yoshitaka Sasaki, Santa Clara, CA (US); Cherng-Chyi Han, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/554,275

(22) Filed: Jul. 20, 2012

(65) Prior Publication Data

US 2012/0281313 A1 Nov. 8, 2012

Related U.S. Application Data

(62) Division of application No. 11/982,597, filed on Nov. 2, 2007, now Pat. No. 8,238,056.

(51) Int. Cl.
*G11B 5/31* (2006.01)
*G11B 5/23* (2006.01)
*G11B 5/11* (2006.01)

(52) U.S. Cl. ............ 360/125.15; 360/119.03; 360/125.3

(58) Field of Classification Search .......... 360/119.02–119.04, 125.15, 125.11, 360/125.3
See application file for complete search history.

(56) References Cited

U.S. PATENT DOCUMENTS

| 5,173,821 | A | 12/1992 | Maloney |
| 5,600,519 | A | 2/1997 | Heim et al. |
| 7,322,095 | B2 | 1/2008 | Guan et al. |
| 7,460,342 | B2 | 12/2008 | Guan et al. |
| 7,777,987 | B2 | 8/2010 | Guan et al. |
| 7,777,988 | B2 | 8/2010 | Guan et al. |
| 7,916,425 | B2 | 3/2011 | Sasaki et al. |
| 7,934,310 | B2 | 5/2011 | Guan et al. |
| 8,027,125 | B2 | 9/2011 | Lee et al. |
| 2005/0219743 | A1 | 10/2005 | Guan et al. |

*Primary Examiner* — Craig A. Renner
*Assistant Examiner* — Gustavo Polo
(74) *Attorney, Agent, or Firm* — Saile Ackerman LLC; Stephen B. Ackerman

(57) ABSTRACT

A PMR writer with a tapered main pole layer and tapered non-magnetic top-shaping layer is disclosed that minimizes trailing shield saturation. A second non-magnetic top shaping layer may be employed to reduce the effective TH size while the bulk of the trailing shield is thicker to allow a larger process window for back end processing. A sloped surface with one end at the ABS and a second end 0.05 to 0.3 microns from the ABS is formed at a 10 to 80 degree angle to the ABS and includes a sloped surface on the upper portion of the main pole layer and on the non-magnetic top shaping layer. An end is formed on the second non-magnetic top shaping layer at the second end of the sloped surface followed by forming a conformal write gap layer and then depositing the trailing shield on the write gap layer and along the ABS.

6 Claims, 6 Drawing Sheets

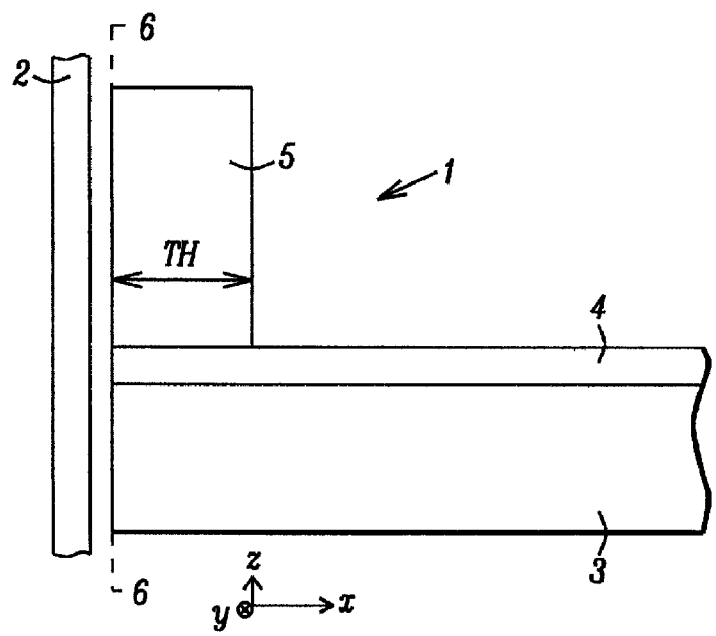
FIG. 1a – Prior Art
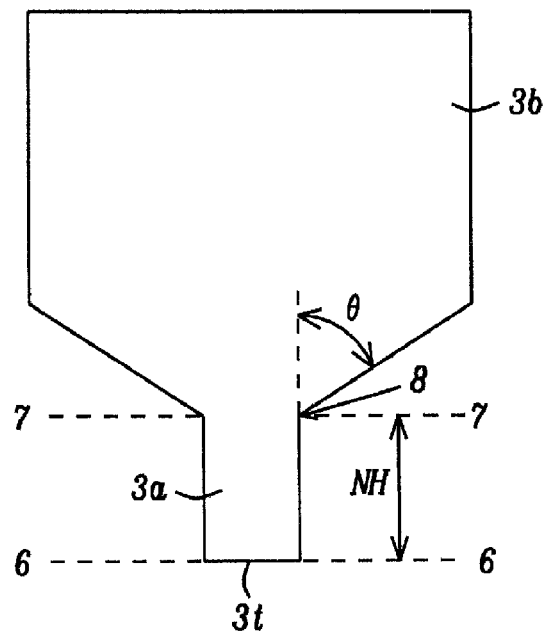
FIG. 1b – Prior Art

PERPENDICULAR SHIELD POLE WRITER WITH TAPERED MAIN POLE AND TAPERED NON-MAGNETIC TOP SHAPING LAYER

This is a Divisional application of U.S. patent application Ser. No. 11/982,597, filed on Nov. 2, 2007, which is herein incorporated by reference in its entirety, and assigned to a common assignee.

RELATED PATENT APPLICATION

This application is related to U.S. Pat. No. 8,027,125, assigned to a common assignee, and which is herein incorporated by reference in its entirety.

FIELD OF THE INVENTION

The invention relates to a PMR writer having a tapered main pole layer and a tapered non-magnetic shaping layer between the main pole layer and an overlying write gap layer to control the effective throat height (TH), and a method for making the same.

BACKGROUND OF THE INVENTION

Shield pole perpendicular magnetic recording (PMR) writers are commonly used in current PMR (hard disk drive) HDD products. PMR writers have become the mainstream technology for disk drive applications beyond 200 Gbit/in$^2$, replacing longitudinal magnetic recording (LMR) devices. Due to the continuing reduction of transducer size, high moment soft magnetic thin films with a Bs above 22 kG are required for write head applications. A PMR head combines the features of a single pole writer and a soft magnetic underlayer to offer a great advantage over LMR in providing higher write field, better read back signal, and potentially much higher areal density. In particular, a shielded pole head can provide a large head field gradient at the trailing side due to the presence of a trailing shield and substantially improve the write performance.

Referring to FIG. 1a, a prior art shield pole PMR writer 1 is depicted from a side-track view. There is an essentially flat write gap layer 4 which separates a main pole layer 3 and a trailing shield 5 by a constant (WG) thickness. One end of the main pole layer is formed along an air bearing surface 6 that is positioned above a magnetic recording medium 2. The height of the trailing shield also known as throat height (TH) is the distance from the side of the trailing shield along the ABS to the side opposite the ABS and is typically about 0.1 to 0.3 microns. The PMR writer moves along the ABS in a negative z direction during a write operation. From a down-track perspective in FIG. 1b, the main pole layer 3 is comprised of a write pole 3a that terminates in a pole tip 3t at the ABS 6-6, and a yoke 3b that flares outward at an angle θ from the end of the write pole opposite the ABS. The end of the write pole 3a lies along the plane 7-7 that is a neck height (NH) distance from the ABS. The intersection of the yoke 3b and write pole 3a is at the neck 8. In order to optimize both write field gradient and write field magnitude, TH (FIG. 1a) is preferably short. However, in prior art PMR writer structures, a short TH can be very challenging to control during the fabrication process. Furthermore, if the TH becomes too small, saturation of the trailing shield and degradation of the signal-to-noise ratio (SNR) may occur. Therefore, an improved PMR writer design is desired that is more tolerant of short TH dimensions and enables improved writability while minimizing trailing shield saturation and avoiding loss of process control during fabrication.

A routine search of the prior art revealed the following references. In U.S. Patent Application Publication No. 2005/0219743, a single pole vertical write head is described having a trailing shield tapered to the same angle as the main pole with a constant write gap thickness between the trailing shield and main pole.

In U.S. Patent Application Publication No. 2005/0237665, the main pole is tapered at the leading side to maintain high trailing field gradients and is shielded on four sides to minimize adjacent track erasure.

U.S. Patent Application Publication No. 2006/0203395 discloses a perpendicular recording head with a tapered magnetic shield to minimize stray fields at the recording surface. The ABS is post-lapped using an ion milling process to produce a recess in the shield away from the ABS at a shallow angle.

In U.S. Pat. No. 5,600,519, first and second magnetic layers in a magnetic head are progressively widened (tapered) between a zero throat point and a flare point so that the length of the magnetic yoke layers between the aforementioned points is saturated nearly simultaneously to provide a constant write field about a saturation value.

U.S. Pat. No. 5,173,821 discloses a write/read head wherein a stepped pole tip effectively forms a wide gap when the head operates as a recording head and forms a narrow gap when the head functions as a read head.

SUMMARY OF THE INVENTION

One objective of the present invention is to provide a shield pole PMR writer with a configuration that reduces the amount of trailing shield saturation.

A second objective of the present invention is to provide a process for fabricating a shield pole PMR writer according to the first objective that includes a means for controlling the effective TH of a trailing shield.

According to the present invention, these objectives are achieved by a tapered main pole layer that has at least one non-magnetic top shaping layer to separate the main pole layer from the write gap layer. In one embodiment, from a cross-track view, the main pole layer has a lower rectangular portion disposed on a substrate and a tapered upper portion adjoining the lower portion in which the taper begins at the ABS and extends away from the ABS and the substrate at an angle of about 10 to 80 degrees for a certain distance to form a sloped section of the top surface. The top surface of the upper portion also has a flat section that is parallel to the plane of the bottom portion and extends from the end of the sloped section opposite the ABS to the back end of the main pole layer in a direction perpendicular to the ABS. Above the tapered main pole layer is a tapered non-magnetic top shaping layer having a bottom surface that coincides with the flat section of top surface in the upper portion of the main pole layer. The tapered non-magnetic shaping layer has a sloped surface that extends from the end of the tapered section of main pole layer and is coplanar with the tapered section of main pole layer. Thus, the plane formed by the sloped surface of the top shaping layer and sloped surface of the upper portion of main pole layer extends from the ABS at an angle between 10 and 80 degrees in a direction away from the substrate, and terminates at an end which is a throat height (TH) distance from the ABS. The top shaping layer has a top surface that is parallel to the top surface of the flat section of the main pole layer. A conformal write gap layer having a constant thickness is formed on the top shaping layer and on the sloped portion of the upper section of main pole layer. In other words, the write gap layer has a sloped section from the ABS to a TH distance from the ABS and a section parallel to the plane of the substrate that covers the top surface of the top shaping layer. There is a trailing shield formed on the sloped section of the write gap layer that has a TH thickness and a length along the ABS which is greater than the combined thicknesses of the top shaping layer and write gap layer.

The present invention takes advantage of a design where tapering a section of the main pole layer adjacent to the ABS serves to concentrate the magnetic flux and generate a larger write field. The top shaping layer is tapered to allow the effective TH of the trailing shield to remain small and to be in good process control. In a second embodiment, the distance (and magnetic reluctance) between the main pole layer and trailing shield is increased to reduce the magnetic flux leakage from the main pole layer to the trailing shield and thereby minimizes saturation of the trailing shield.

The second embodiment has a tapered main pole layer formed on a substrate as in the first embodiment and there is a first non-magnetic top shaping layer formed on the flat top surface of the main pole layer. In addition, there is a second top shaping layer with a rectangular shape that is formed on the top flat surface of the first top shaping layer. A conformal write gap layer with an essentially constant thickness is formed on the sloped sections of the main pole layer and first top shaping layer, on the top surface of the second top shaping layer, and along a side of the second top shaping layer that faces the ABS. The trailing shield is formed on the write gap layer and along the ABS, and extends over a portion of the write gap layer disposed on the top surface of the second top shaping layer. The trailing shield has a length along the ABS that is greater than the combined thicknesses of the first top shaping layer, second top shaping layer, and write gap layer. The effective throat height distance is defined as the thickness of the trailing shield between the ABS and the portion of the write gap layer along the side of the second top shaping layer that faces the ABS.

BRIEF DESCRIPTION OF THE DRAWINGS

FIG. 1a is a cross-track view of a prior art shield pole PMR writer with a flat write gap layer that has a constant thickness on the main pole layer and FIG. 1b is a down-track view of a prior art PMR writer.

DETAILED DESCRIPTION OF THE INVENTION

The present invention is shield pole PMR writer having a tapered main pole layer and a tapered top shaping layer for minimizing trailing shield saturation and a method for making the same. The exemplary embodiment shows only a portion of the main pole layer proximate to an ABS. The present invention anticipates that the PMR writer may be part of a merged read/write head. Furthermore, the main pole layer may be comprised of a single piece or have a stitched pole configuration. From a down-track perspective, the main pole layer may have various shapes such as the conventional shape shown in FIG. 1b or one with curved sides in the yoke as appreciated by those skilled in the art.

Figure 2:
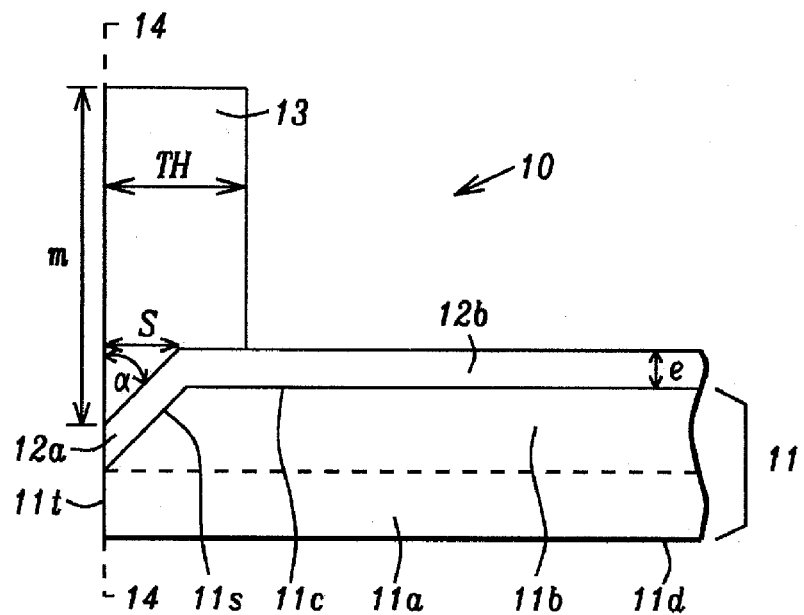
FIG. 2 is cross-track view of a shield pole PMR writer previously designed by the inventors that has a tapered main pole layer and tapered write gap layer.

Referring to FIG. 2, the inventors have previously designed a PMR writer 10 with a tapered main pole layer 11 and a tapered write gap layer that is conformally laid on an upper portion 11b of the main pole layer. The write gap layer is comprised of a sloped section 12a adjacent to the ABS 14-14 and a flat section 12b formed parallel to the bottom surface 11d of the main pole layer, and has a constant thickness e also known as the WG thickness. A bottom portion 11a of the main pole layer 11 is disposed on a substrate (not shown) which may be an insulating layer, for example, and terminates at a pole tip 11t at the ABS 14-14. There is a trailing shield 13 having a thickness TH (perpendicular to the ABS) on the sloped section 12a and over a portion of the flat section 12b of the write gap layer. The sloped section 12a is tapered at an angle $\alpha$ of about 10 to 80 degrees with respect to the ABS 14-14 and extends from the ABS in a direction away from the bottom surface 11d. One end of the sloped section 12a terminates at a distance s of about 0.05 to 0.30 microns from the ABS. The trailing shield 13 has a length m along the ABS that is greater than the combined thicknesses of the write gap layer 12b and upper portion 11b of the main pole layer. By forming a tapered main pole layer 11, magnetic flux will be concentrated at the ABS and a larger write field can be expected.

Figure 3:
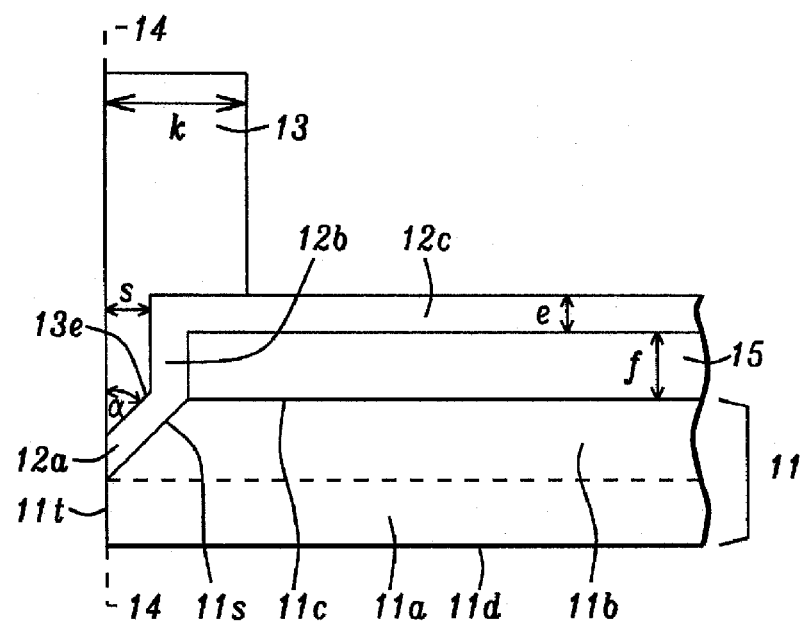
FIG. 3 is a cross-track view of a shield pole PMR writer previously designed by the inventors that has a tapered main pole layer and a rectangular top shaping layer on the main pole layer.

Referring to FIG. 3, another PMR writer design previously designed but not published by the inventors is shown and combines the features of the structure in FIG. 2 with a non-magnetic top shaping layer 15 having a thickness f formed between the upper portion 11b of the tapered main pole layer and a section 12c of the write gap layer to further improve writability. In this example, the top shaping layer 15 is essentially rectangular in shape and is formed only on a flat surface 11c of the main pole layer that is parallel to the bottom surface 11d. The write gap layer is comprised of a section 12a formed on the tapered surface 11s of the main pole layer 11, a section 12b formed on an end of the top shaping layer 15 that faces the ABS, and a section 12c formed on the upper surface of the top shaping layer which is parallel to the plane of the substrate and bottom surface 11d. The effective TH of the trailing edge 13e is shown as the distance s and is defined as the thickness of the trailing shield 13 between write gap section 12b and the ABS 14-14. Thus, the effective TH thickness of the trailing shield can remain small as desired in advanced PMR writers while the thickness k of the trailing shield above the write gap layer 12c can be thicker than s and thereby allows a wider process window for processing steps including back end steps. However, when the effective TH or "s" dimension becomes too thin, this design may have issues with saturation of the trailing shield 13 due to the trailing shield's close proximity to the main pole layer 11. As a result, additional modification of the tapered main pole layer design shown in FIGS. 2 and 3 is desirable.

The inventors have discovered that the performance of a shield pole PMR writer may be further improved by addition of a tapered top shaping layer to the designs originally proposed in FIGS. 2 and 3.

Figure 4A:
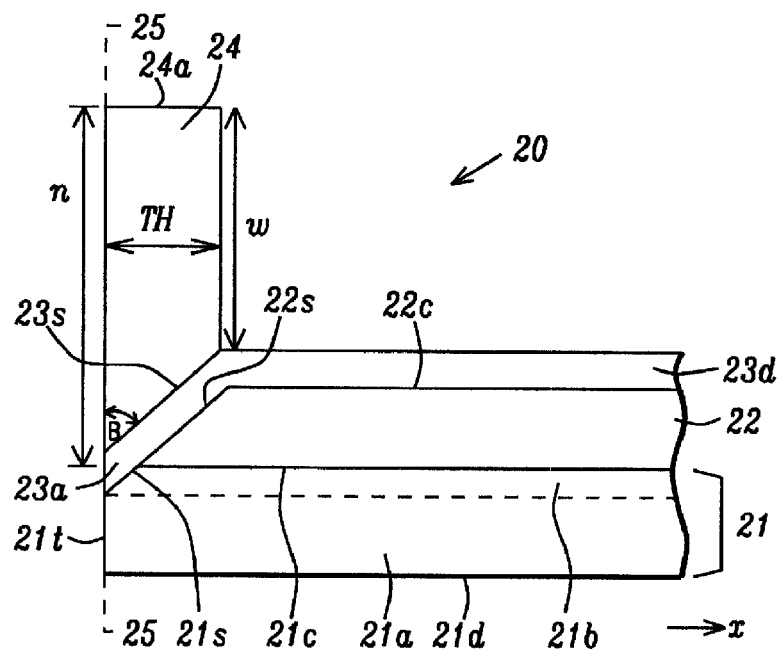
FIG. 4a is a cross-track view of a PMR writer having a tapered top shaping layer on a tapered main pole layer according to one embodiment of the present invention.

Referring to FIG. 4a, a first embodiment of the present invention is depicted as a PMR writer 20 that represents a modification of the PMR writer structure in FIG. 2. A main pole layer 21 with a bottom surface 21d formed on a substrate (not shown) is comprised of a lower rectangular portion 21a having a pole tip 21t at an ABS 25-25, and a tapered upper portion 21b which adjoins the lower rectangular portion and has a flat upper surface 21c that is parallel to the bottom surface 21d. The tapered upper portion 21b has a sloped surface 21s that begins at the ABS and extends away from the lower rectangular portion 21a at an angle β of about 10 to 80 degrees with respect to the ABS 25-25. In other words, the sloped surface 21s has one end at the ABS and a second end at a position where the sloped surface 21s intersects the flat upper surface 21c.

There is a non-magnetic tapered top shaping layer 22 made of $Al_2O_3$, Ru, or the like having a thickness from 0 to 0.3 microns that is formed on the flat upper surface 21c of the tapered upper portion 21b of the main pole layer 21. It should be understood that the main pole layer 21 and tapered top shaping layer 22 extend in the "x" direction perpendicular to the ABS for up to 5 to 20 microns before terminating at the back end (not shown) of the main pole layer. The tapered top shaping layer 22 has a sloped surface 22s which is an extension of the sloped surface 21s. The sloped surface 22s begins at the end of the sloped surface 21s opposite the ABS and continues to a second end that is a distance of 0.1 to 0.3 microns from the ABS 25-25. Thus, the sloped surface 21s and sloped surface 22s form a plane that faces the ABS at an angle between 10 and 80 degrees. The point where the sloped surface 22s adjoins the sloped surface 21s is recessed about 0.05 to 0.20 microns from the ABS 25-25 and this recess represents the effective throat height distance. The tapered top shaping layer 22 also has a flat upper surface 22c that is parallel to the flat upper surface 21c of the main pole layer 21.

Another feature of the first embodiment is a conformal write gap layer comprised of a sloped section 23a with a surface 23s formed on the sloped surfaces 21s, 22s, and a section 23d on the flat upper surface 22c. The sloped section 23a has an end along the ABS and adjoins section 23d at a distance of 0.1 to 0.3 microns from the ABS 25-25. The write gap layer may be a non-magnetic material such as $Al_2O_3$ or the like and has a thickness from 0.02 to 0.08 microns. Above the sloped section 23a of the write gap layer is a trailing shield 24 that may be comprised of a high Bs magnetic material such as Fe, Co, Ni, FeNi, CoFe, or alloys thereof. The main pole layer 21 may also be comprised of the same high Bs magnetic material. The trailing shield has a first side along the ABS 25-25 with a length n and a second side opposite and parallel to the ABS with a length w that is less than n. The distance between the first and second sides is the TH distance. The second side opposite the ABS has one end at the intersection of the sloped section 23a and section 23d of the write gap layer. There is a sloped side of the trailing shield 24 disposed on the sloped surface 23s of the write gap layer which is formed at an angle β with respect to the ABS. A fourth side 24a of the trailing shield opposite the sloped surface 23s is preferably aligned perpendicular to the ABS 25-25.

The PMR writer 20 has an advantage over the structure shown in FIG. 2 in that the flat upper surface 21c of the main pole layer 21 is a greater distance from the trailing shield 24 than the upper surface 11c is from trailing shield 14. As a result, there is less magnetic flux leakage from the main pole layer 21 to the trailing shield 24 in PMR writer 20 which means saturation of the trailing shield 24 will be reduced.

Figure 4B:
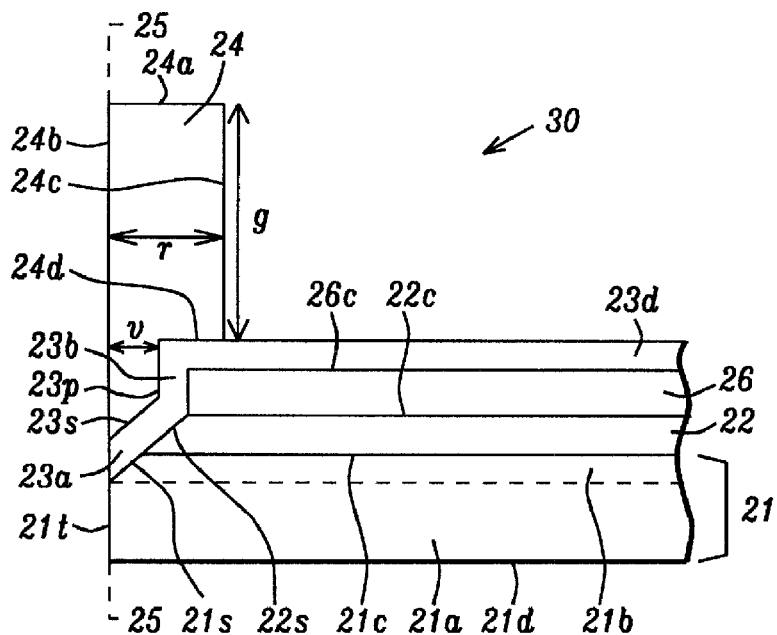
FIG. 4b is a cross-track view of a PMR writer having a second top shaping layer formed on a tapered first top shaping layer on a tapered main pole layer according to a second embodiment of the present invention.

Referring to FIG. 4b, a second embodiment of the present invention is depicted as a PMR writer 30 that represents a modification of the PMR writer structure in FIG. 3. In particular, a tapered top shaping layer 22 is inserted between a rectangular top shaping layer 26 and the top surface 21c of the main pole layer 21. The main pole layer 21 has the same configuration as described previously with respect to FIG. 4a. Furthermore, the plane formed by sloped surface 21s and sloped surface 22s is formed at an angle β with respect to the ABS similar to FIG. 4a, but terminates at an end which is less than the length of side 24a from the ABS 25-25. As in the first embodiment, the sloped surface 22s may terminate at an end that intersects top surface 22c which is from about 0.5 to 0.30 microns from the ABS.

Above the flat upper surface 22c of the tapered first non-magnetic top shaping layer is a second non-magnetic top shaping layer 26 that has a thickness from 0 to 0.5 microns. The second non-magnetic top shaping layer 26 may be comprised of the same material as in the tapered first non-magnetic top shaping layer 22. The second non-magnetic top shaping layer 26 has a bottom surface that is coincident with top surface 22c and has a flat top surface 26c which terminates at a first end which is parallel to the ABS and is recessed the same distance from the ABS 25-25 as the intersection of sloped surface 22s and top surface 22c. A second end of the second non-magnetic top shaping layer 26 is at the back end (not shown) of the main pole layer 21.

There is a conformal write gap layer having a thickness from 0.02 to 0.08 comprised of a sloped section 23a on the sloped surfaces 21s, 22s, a section 23b formed on the first end of the second non-magnetic top shaping layer 26 that faces the ABS 25-25, and a section 23d which covers the flat upper surface 26c. The sloped section 23a has an end along the ABS and a second end that adjoins one end of section 23b. Note that the section 23b has a surface 23p facing the ABS which is a distance v from the ABS 25-25. The distance v represents the effective TH distance and is preferably about 0.05 to 0.3 microns.

A trailing shield 24 has a first side that is coincident with the surface 23s of the sloped section 23a, and a second side 24b formed along the ABS 25-25. The trailing shield 24 has a third side 24a opposite the surface 23s and preferably aligned perpendicular to the ABS. There is a fourth side 24c of the trailing shield that connects an end of the side 24a opposite the ABS to the write gap layer section 23d. Fourth side 24c is parallel to the ABS and has a length g which is less than the length of side 24b. Fourth side 24c intersects write gap layer section 23d at a distance r of about 0.1 to 0.5 microns from the ABS 25-25. A fifth side 24d of the trailing shield extends from an end of fourth side 24c at section 23d and terminates at surface 23p of section 23b. A sixth side of the trailing shield 24 is coincident with surface 23p of section 23b.

The PMR writer 30 has an advantage over the structure shown in FIG. 3 in that the main pole layer 21 is a greater distance from the trailing shield 24 than the main pole layer 11 is from trailing shield 14. As a result, there is less magnetic flux leakage from the main pole layer 21 to the trailing shield 24 in PMR writer 30 which means saturation of the trailing shield 24 will be reduced. Similar to the structure in FIG. 3, the rectangular top shaping layer is advantageously used to control the effective TH distance. Therefore, the effective TH distance or "v" can be small and be in good process control while the thickness of the trailing shield or "r" may be thick and thereby offers a better process window for back end fabrication schemes.

Figure 5A:
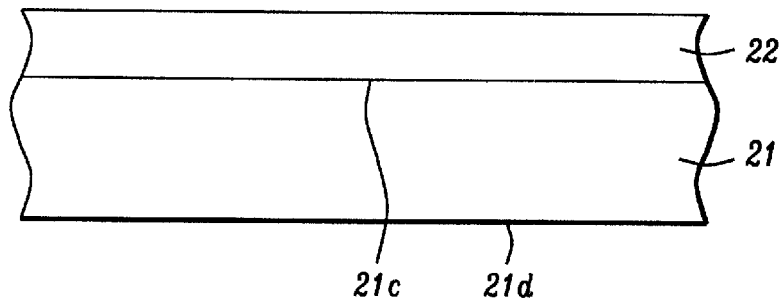
FIGS. 5a-5d are cross-sectional views that depict a sequence of steps for forming a PMR writer according to the first embodiment of the present invention.

Referring to FIGS. 5a-5d, a sequence of steps is depicted for fabricating the PMR writer 20 of the first embodiment. In FIG. 5a, the main pole layer 21 is deposited on a substrate (not shown) that may be an insulation layer in a merged read/write head as appreciated by those skilled in the art. Note that the bottom surface 21d is coincident with the top surface of the substrate. The main pole layer 21 may be formed by an electroplating or sputter deposition method. In one embodiment, a mold or opening having the shape of the intended main pole layer is formed within a second insulation layer (not shown) disposed on the substrate. The main pole layer is then deposited to fill the opening and is subsequently planarized such that the top surface has a uniform thickness and is coplanar with the top surface of the second insulation layer. Optionally, the main pole layer material may be electroplated or sputter deposited on a substrate and then patterned in the shape of a main pole layer by a well known photoresist patterning and etching sequence. Thereafter, the photoresist is removed and the second insulation layer is deposited on the main pole layer and on exposed portions of the substrate. Then a chemical mechanical polish (CMP) step may be performed to planarize the second insulation layer to become coplanar with the main pole layer 21. The ABS plane 25-25 is not shown because it is not formed until later in the fabrication sequence after the entire stack of layers in the PMR writer 20 is built.

The next step is to deposit the non-magnetic top shaping layer 22 having a thickness from 0 to about 0.3 microns on the main pole layer 21 by a sputter deposition process, for example. All sputter deposition steps during the fabrication of PMR writer 20 may be performed in a single mainframe such as an Anelva C-7100 sputter deposition system which includes ultra high vacuum DC magnetron sputter chambers with multiple targets and at least one oxidation chamber. Typically, the sputter deposition process involves an argon sputter gas and a base pressure between $5\times10^{-8}$ and $5\times10^{-9}$ torr. A lower pressure enables more uniform films to be deposited.

Figure 5B:
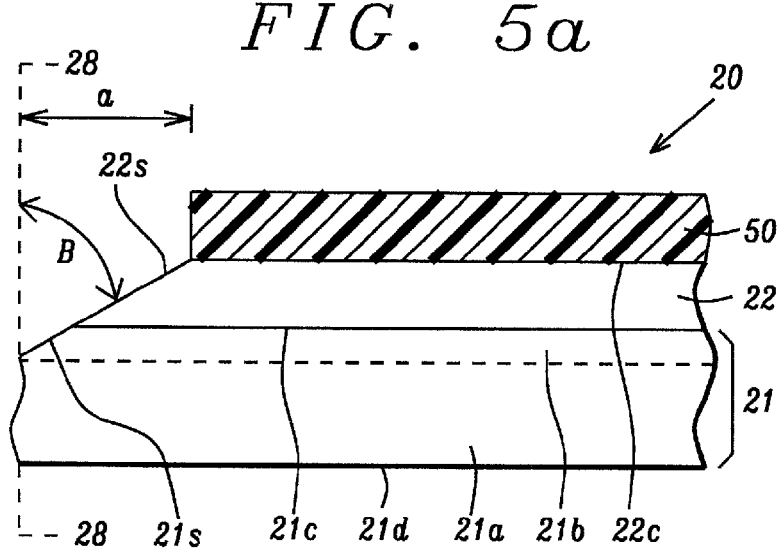

Referring to FIG. 5b, a photoresist layer 50 is coated on the non-magnetic top shaping layer 22 and is patterned to cover a region that will become the top surface 22c in the PMR writer 20. Although the photoresist layer 50 is shown recessed the same distance a from a plane 28-28 as the intended end of sloped surface 22s, the photoresist layer 50 may optionally be recessed a greater distance than a. Thereafter, an ion beam etch (IBE) step is performed that is directed an angle toward the photoresist layer 50 and non-magnetic top shaping layer 22. The etch process continues until the sloped surface 22s and sloped surface 21s are generated to produce a tapered top shaping layer 22 and a tapered main pole layer 21, respectively. The sloped surfaces 21s, 22s form a plane that is oriented away from the bottom surface 21d and at an angle β of about 10 to 80 degrees with respect to a plane 28-28 that is oriented perpendicular to the bottom surface. The distance a between the patterned photoresist layer 50 and the plane 28-28 should be greater than the intended TH distance since a lapping process later in the fabrication sequence will remove a portion of the main pole layer 21 adjacent to plane 28-28 and thereby form an ABS 25-25 as depicted in FIG. 4a.

Figure 5C:
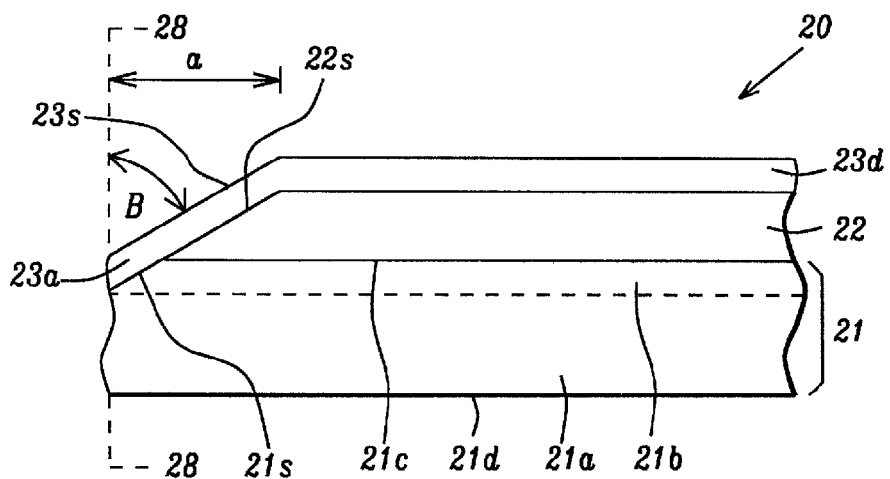

Referring to FIG. 5c, the photoresist layer 50 is stripped by a conventional method such as oxygen ashing and then the write gap layer comprised of a sloped section 23a and section 23d is deposited by a physical vapor deposition (PVD) method or chemical vapor deposition (CVD) process, for example. The write gap layer may be made of $Al_2O_3$ or another non-magnetic material such as Ru and is deposited by a process that yields a conformal write gap layer having an essentially constant thickness in sections 23a, 23d. As a result, section 23a is formed at an angle β with respect to the plane 28-28 that is perpendicular to the bottom surface 21d and has an end adjoining section 23d which is a distance a from the plane 28-28.

Figure 5D:
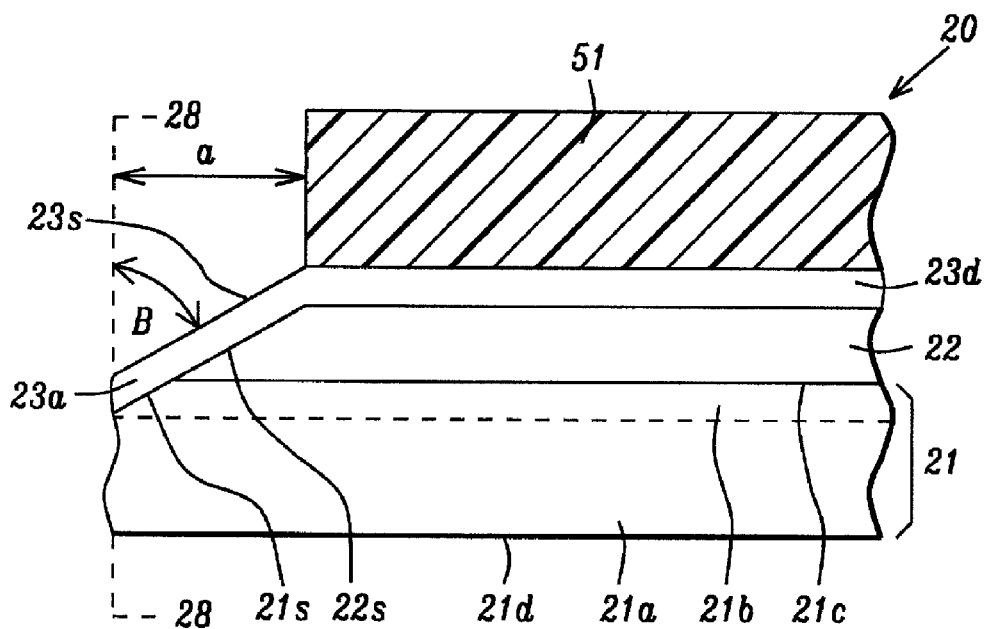

Referring to FIG. 5d, a photoresist layer 51 is coated on the write gap layer and patterned to cover section 23d of the write gap layer. Section 23a is uncovered by the photoresist patterning step. Next, the shield layer 24 is deposited on section 23a by a electroplating or sputter deposition process. Typically, a seed layer (not shown) is deposited on section 23a before the shield layer 24 is formed in order to assist the electroplating process. A CMP step may be employed to planarize the shield layer 24 and form the end 24a of the trailing shield shown in FIG. 4a. The photoresist layer 51 is then removed by a conventional method. Finally, a lapping process is performed to form the ABS 25-25 depicted in FIG. 4a. The ABS is formed between the plane 28-28 and the non-magnetic top shaping layer 22 and is substantially perpendicular to the substrate. It should be understood that a plurality of PMR writers 20 may be formed simultaneously in rows and columns on a substrate and later separated from each other by a process that dices the wafer into chips.

Figure 6A:
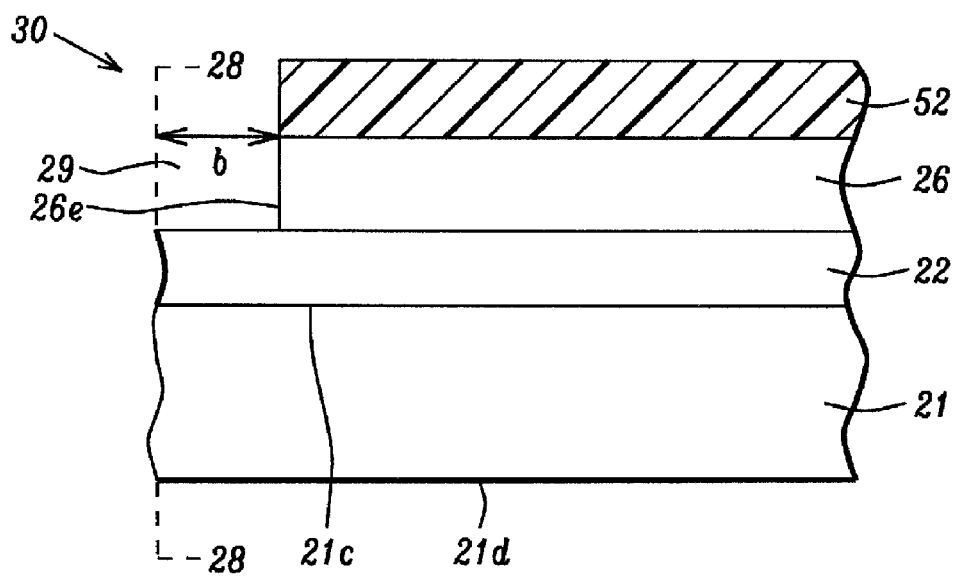
FIGS. 6a-6c are cross-sectional views that depict a sequence of steps for forming a PMR writer according to a second embodiment of the present invention.
Figure 6B:
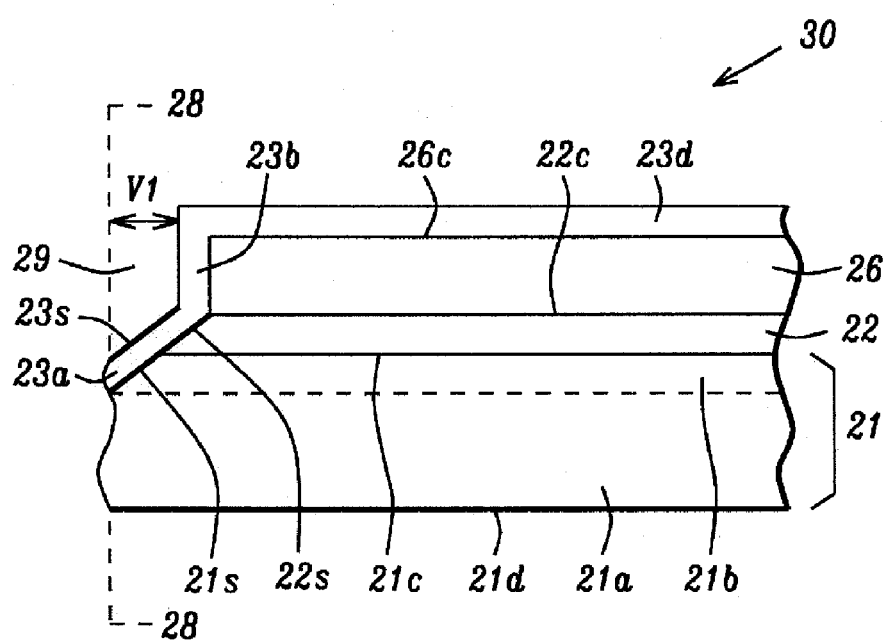
Figure 6C:
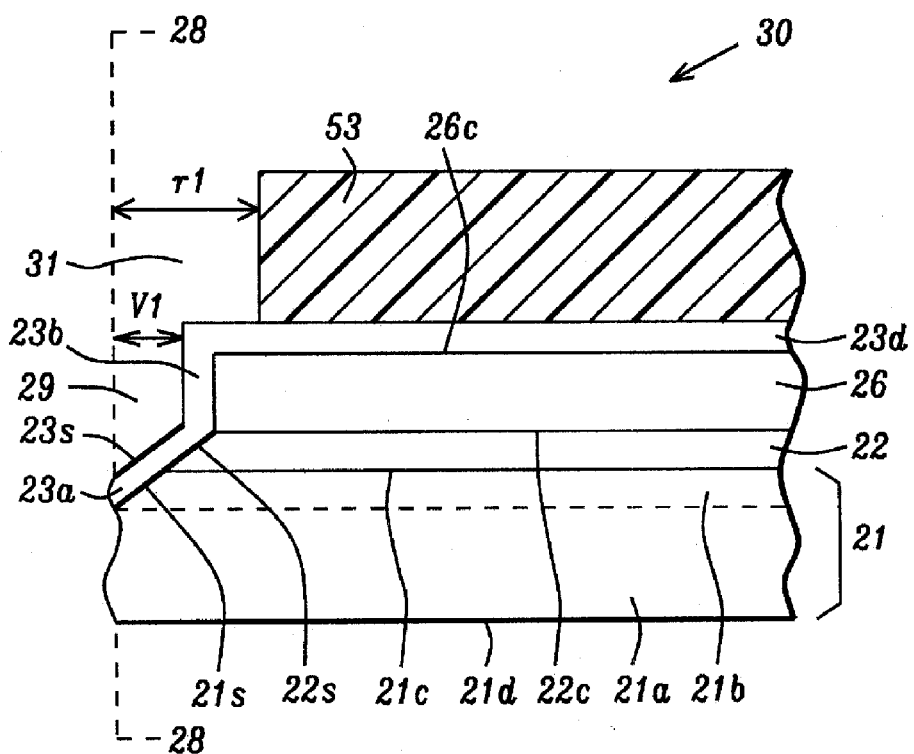

In FIGS. 6a-6c, a sequence of steps is depicted for fabricating the PMR writer 30 of the second embodiment. Referring to FIG. 6a which is a cross-track view of the partially formed PMR writer 30, a main pole layer 21 and a first top shaping layer 22 are sequentially deposited on a substrate as described with respect to FIG. 5a in the first embodiment. A second non-magnetic top shaping layer 26 is deposited on the first top shaping layer 22 and may be a single non-magnetic layer or a composite having a plurality of non-magnetic layers. Next, a photoresist layer 52 is patterned on the second non-magnetic top shaping layer 26 to generate an opening 29 having a width b between a plane 28-28 and the photoresist layer 52. An etching step that may be a reactive ion etch (RIE) process is used to transfer the opening 29 through the second non-magnetic top shaping layer 26 and thereby form an end 26e parallel to the plane 28-28. The opening 29 in the second non-magnetic top shaping layer 26 preferably has a width b. The patterned photoresist layer 52 defines the top surface 26c (FIG. 6b) of the second non-magnetic top shaping layer 26 in the PMR writer 30 and is removed after the RIE step is complete. Note that the location of the ABS will be determined by a lapping process in a later step and the ABS 25-25 (FIG. 4b) will be positioned between the plane 28-28 and the non-magnetic top shaping layer 26.

Referring to FIG. 6b, a second etch step that may be an IBE process is performed at an oblique angle with respect to the plane 28-28 to form a tapered upper portion 21b of the main pole layer 21 and a tapered first non-magnetic top shaping layer 22. The second etch is preferably performed after a photoresist layer (not shown) is coated on the non-magnetic top shaping layer 26 and then patterned as understood by those skilled in the art. The taper angle is 10 to 80 degrees similar to angle β in the first embodiment. As a result, a sloped surface 21s is formed on the upper portion 21b of the main pole layer and a sloped surface 22s is formed on the first non-magnetic top shaping layer 22 below opening 29. The patterned photoresist layer used for the IBE process may then be removed. Thereafter, the write gap layer comprised of sloped section 23a, section 23b, and section 23d is conformally laid down on the sloped surfaces 21s, 22s, and on the top surface 26c of the second non-magnetic top shaping layer 26 with a thickness that is essentially constant in sections 23a, 23b, and 23d. Sloped section 23a is formed on the sloped surfaces 21s, 22s while section 23b adjoins the end 26e, and section 23d is disposed on top surface 26c. The write gap layer may be made of $Al_2O_3$ or Ru as mentioned previously and may be deposited by a PVD or CVD method, for example. The opening 29 now has a width $v_1$ that is less than the width b (FIG. 6a) because of the additional write gap layer. In particular, the section 23b facing the plane 28-28 reduces the width of the opening 29. The width $v_1$ is greater than the effective TH distance v that separates ABS 25-25 and write gap layer section 23b in the completed PMR writer 30.

Referring to FIG. 6c, a photoresist layer 53 is coated and patterned on the write gap layer to form an opening 31 above opening 29. Opening 31 has a width $r_1$ (greater than r in FIG. 4b) and uncovers a portion of the write gap layer section 23d adjacent to section 23b. The openings 29 and 31 define the shape of the trailing shield which is preferably deposited by an electroplating process in the openings in the following step. Next, the photoresist layer 53 is removed and an insulation layer (not shown) may be deposited on the trailing shield and on section 23d of the write gap layer. Thereafter, a CMP process may be used to planarize the trailing shield 24 to form the end 24a (FIG. 4b) which is parallel to bottom surface 21d in the main pole layer 21 and is coplanar with the adjacent insulation layer. Subsequently, a lapping process is employed to remove a portion of the trailing shield 24, sloped section 23a, and the bottom portion 21a of the main pole layer adjacent to plane 28-28 and thereby form the ABS 25-25 and the PMR writer 30 shown in FIG. 4b.

Both embodiments provide an advantage over existing PMR writers in that saturation of the trailing shield is minimized by the designs described herein that include a tapered main pole layer and a tapered top shaping layer. Furthermore, the tapered main pole layer and tapered top shaping layer enable the effective TH to be small while the bulk of the trailing shield is larger and thereby allows a larger process window during back end fabrication steps such as the CMP step that planarizes the trailing shield and adjacent insulation layer.

While this invention has been particularly shown and described with reference to, the preferred embodiment thereof, it will be understood by those skilled in the art that various changes in form and details may be made without departing from the spirit and scope of this invention.

We claim:

1. A perpendicular magnetic recording (PMR) writer, comprising:
   (a) a tapered main pole layer comprised of a lower portion formed on a substrate and having a pole tip at an air bearing surface (ABS), and an upper portion having a sloped surface with a first end at the ABS and an opposite end formed a first distance from the ABS such that said opposite end is a greater distance from the substrate than the first end, said lower portion has an upper surface formed parallel to the substrate and said upper portion has an upper surface connected to the opposite end of the sloped surface and aligned parallel to the substrate;
   (b) a tapered first non-magnetic top shaping layer formed on the upper surface of the upper portion of the main pole layer, said non-magnetic top shaping layer has a sloped surface with a second end connected to the opposite end of the sloped surface of the main pole layer and a third end that is a greater distance from the substrate than the second end, and said non-magnetic top shaping layer has an upper surface that is parallel to the substrate and is connected to the third end at a second distance from the ABS;
   (c) a second non-magnetic top shaping layer formed on the upper surface of the tapered first non-magnetic top shaping layer, said second non-magnetic top shaping layer has an end formed parallel to the ABS and separated by the second distance from the ABS, and has an upper surface connected to said end and formed parallel to the substrate;
   (d) a conformal write gap layer having a first section with a top surface formed on the sloped surface of the upper portion of the main pole layer and on the sloped surface of the first non-magnetic top shaping layer, a second section having a top surface facing the ABS on said end of the second non-magnetic top shaping layer, and a third section on the upper surface of the second non-magnetic shaping layer that extends to a third distance from the ABS; and
   (e) a trailing shield formed on the first section and over a portion of the third section of the conformal write gap layer, said trailing shield has a first side along the ABS, a second side opposite the first side that is a second distance from the ABS, a third side coincident with the top surface of said first section, a fourth side coincident with the top surface of said second section, and a side opposite the third side that connects the first and second sides.

2. The PMR writer of claim 1 wherein the sloped surface of the upper portion of the main pole layer and the sloped surface of the tapered first non-magnetic top shaping layer form a plane aligned at an angle of about 10 degrees to 80 degrees with respect to the ABS.

3. The PMR writer of claim 2 wherein the plane extends a distance of about 0.05 to 0.30 microns from the ABS.

4. The PMR writer of claim 1 wherein the tapered first non-magnetic top shaping layer has a thickness from 0 to about 0.3 microns and is comprised of $Al_2O_3$ or Ru.

5. The PMR writer of claim 1 wherein the second non-magnetic top shaping layer has a thickness from 0 to about 0.5 microns and is made of the same material as in the tapered first non-magnetic top shaping layer.

6. The PMR writer of claim 1 wherein the conformal write gap layer has a thickness of about 0.02 to 0.08 microns and is made of a non-magnetic material.

* * * * *